United States Patent
Espenes et al.

(10) Patent No.: US 9,020,665 B1
(45) Date of Patent: Apr. 28, 2015

(54) WINDS ALOFT SYMBOLOGY PRESENTATION SYSTEM, DEVICE, AND METHOD

(71) Applicants: Michael G. Espenes, Robins, IA (US); Mark W. Volner, Marion, IA (US)

(72) Inventors: Michael G. Espenes, Robins, IA (US); Mark W. Volner, Marion, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

(21) Appl. No.: 13/927,307

(22) Filed: Jun. 26, 2013

(51) Int. Cl.
  *B64D 45/00* (2006.01)
(52) U.S. Cl.
  CPC ................... *B64D 45/00* (2013.01)
(58) Field of Classification Search
  CPC .......... G08G 5/0091; G01G 1/00; G01G 1/10
  USPC .............................. 701/14; 340/945, 949, 953
  See application file for complete search history.

(56) References Cited

U.S. PATENT DOCUMENTS

| 4,642,775 A * | 2/1987 | Cline et al. ................. 701/528 |
| 8,065,082 B2 * | 11/2011 | Suddreth et al. ............ 701/436 |
| 8,457,889 B2 * | 6/2013 | Feyereisen et al. .......... 701/467 |
| 2014/0039734 A1 * | 2/2014 | Ramaiah et al. ............. 701/14 |

* cited by examiner

*Primary Examiner* — Mary Cheung
*Assistant Examiner* — Anne Mazzara
(74) *Attorney, Agent, or Firm* — Angel N. Gerdzhikov; Donna P. Suchy; Daniel M. Barbieri

(57) ABSTRACT

A present novel and non-trivial system, device, and method for presenting winds aloft symbology on an aircraft display unit are disclosed. Symbology image data representative of a plurality of sets of winds aloft symbologies may be generated as a function of flight plan data and weather data; flight plan data representative flight plan comprised of a plurality of waypoints may be received along with weather data representative of winds aloft data corresponding to each waypoint. Each set of winds aloft symbologies may be comprised of winds aloft symbology corresponding to each waypoint of the flight plan at a single altitude and symbolize winds aloft at that altitude. When provided to a display unit, each set of winds aloft symbologies represented in the symbology image data may be presented in a series of increasing or decreasing altitudes, where the series is presented sequentially or simultaneously.

21 Claims, 17 Drawing Sheets

|      | 12000   | 18000   | 24000   | 30000     | 34000     | 39000     |
|------|---------|---------|---------|-----------|-----------|-----------|
| KDCA | 223/027 | 224/027 | 224/037 | 223/053   | 218/058   | 223/057   |
| KCVG | 268/030 | 251/038 | 249/042 | 247/044   | 243/046   | 237/044   |
| KORD | 326/020 | 290/025 | 282/032 | 287/038   | 274/034   | 269/031   |
| KCID | 352/029 | 334/039 | 322/050 | Not Avail | Not Avail | Not Avail |

|      | 12000              | 18000              | 24000              | 30000              | 34000              | 39000              |
|------|--------------------|--------------------|--------------------|--------------------|--------------------|--------------------|
| KDCA | 271/018            | 271/018            | 271/025            | 271/035            | 271/035            | 271/040            |
| KCVG | 269/030<br>320/018 | 269/036<br>320/014 | 269/039<br>320/014 | 269/041<br>320/013 | 269/041<br>320/010 | 269/037<br>320/005 |
| KORD | 319/020<br>269/011 | 319/022<br>269/023 | 319/026<br>269/031 | 319/032<br>269/036 | 319/024<br>269/034 | 319/020<br>269/031 |
| KCID | 265/002            | 265/014            | 265/027            | Not Avail          | Not Avail          | Not Avail          |

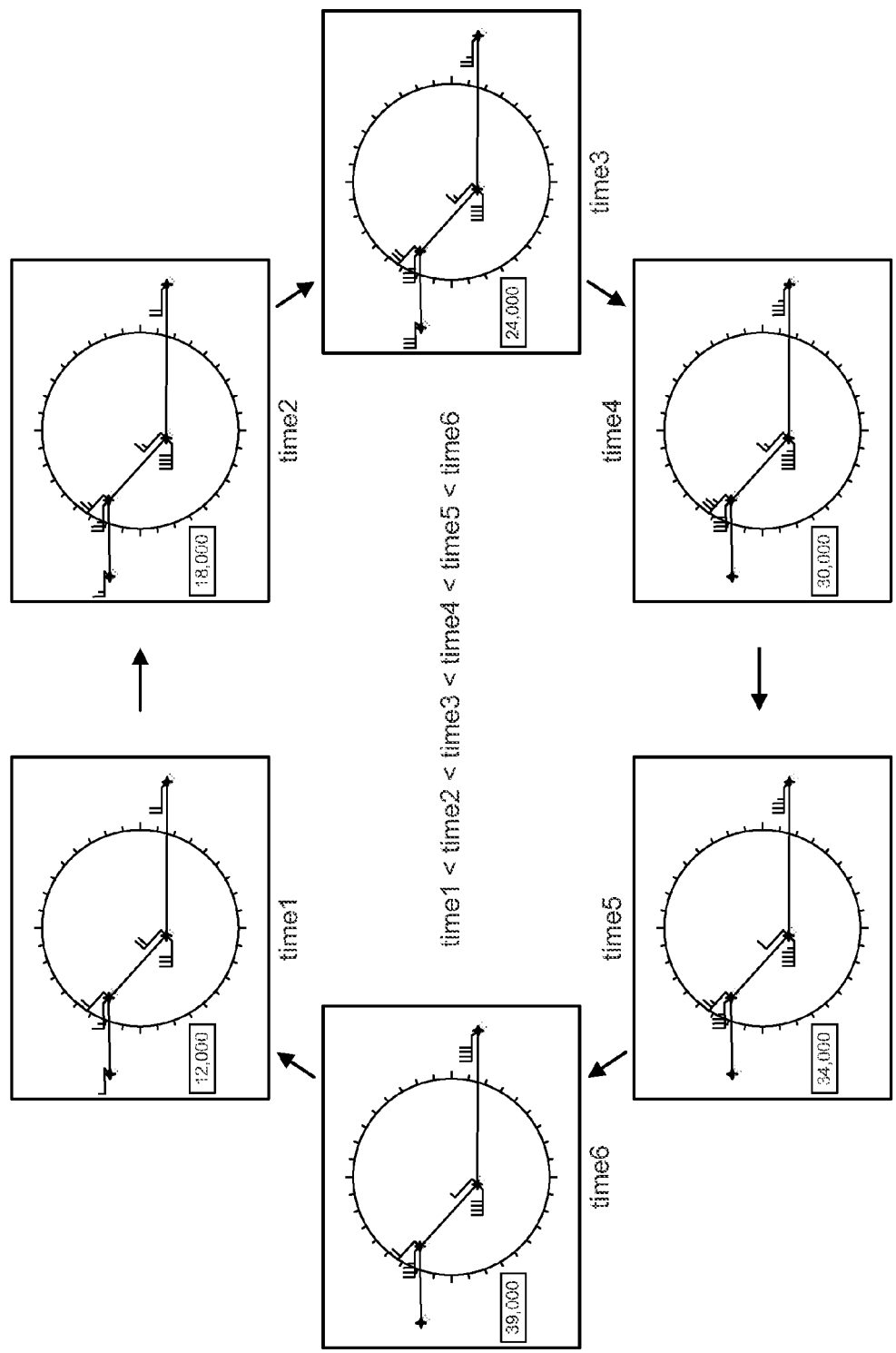

WINDS ALOFT SYMBOLOGY PRESENTATION SYSTEM, DEVICE, AND METHOD

BACKGROUND OF THE INVENTION

1. Field of the Invention

This invention pertains generally to the field of aircraft display units that provide information to the pilot or flight crew of an aircraft.

2. Description of the Related Art

Winds and temperatures aloft forecasts provide wind and temperature forecasts for specific locations in the contiguous United States, including network locations in Hawaii and Alaska. At the time of this writing, the forecasts are made twice a day based on the radiosonde upper air observations.

Wind directions and winds speeds at one attitude are not the same at a different altitude at the same location at the same time; that is, winds direction and wind speed change with changes in altitude. Generally, wind speeds at upper altitudes are greater than those at lower altitudes.

Once the forecasts are made, the winds aloft information at a specific time may be charted graphically in a symbolic form that is known to those skilled in the art. Typically, each chart corresponds to one altitude at the specific time. In order to determine the differences in wind direction and wind speed between a plurality of altitudes at one time and perhaps a more favorable altitude at which to fly, a pilot may be required to locate the charts applicable to the altitudes of interest and shuffle between charts, thereby requiring him or her to shift his or her focus and/or attention away from the chart and cause a momentary distraction to his or her situational awareness of expected winds aloft in a current or contemplated flight plan.

BRIEF SUMMARY OF THE INVENTION

The embodiments disclosed herein present at least one novel and non-trivial system, device, and method for presenting winds aloft symbology on an aircraft display unit. The use of graphical aids such as symbology may be used to enhance a pilot's situational awareness of expected winds aloft in a current or contemplated flight plan.

In one embodiment, a system is disclosed for presenting winds aloft symbology on a display unit. The system could be comprised of a cockpit display system which includes a symbology generator ("SG") and a display unit, where the SG may be configured to perform the method discussed below.

In another embodiment, a device is disclosed for presenting winds aloft symbology on a display unit. The device could be comprised of the SG configured to generate symbology image data representative of a plurality of sets of winds aloft symbologies, where each set of winds aloft symbologies may be comprised of winds aloft symbology corresponding to one or more waypoints of a flight plan and symbolize winds aloft at a single altitude; as embodied herein, the winds aloft symbolized in each set of winds aloft symbologies may be based upon (1) the actual direction and speed from which the wind is coming or (2) the direction of a flight leg. When provided to a display unit, each set of winds aloft symbologies may be presented in a series of increasing or decreasing altitudes. In one configuration, the series may be sequentially so that one set of winds aloft symbologies is viewable at one time. In another configuration, the series may be simultaneously so that a plurality of sets of winds aloft symbologies is viewable at one time.

In another embodiment, a method is disclosed for presenting winds aloft symbology on a display unit, where such method could be performed by the SG. When properly configured, the SG may receive flight plan data representative of waypoint information; receive weather data representative of available winds aloft information for plurality of altitudes corresponding to the plurality of waypoints; generate symbology image data representative of a plurality of sets of winds aloft symbologies as a function of the flight plan data and the weather data; and provide the symbology image data to at least one display unit.

BRIEF DESCRIPTION OF THE DRAWINGS

FIG. 9A illustrates a second series of sets of winds aloft symbology in an order of increasing altitudes being presented sequentially.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
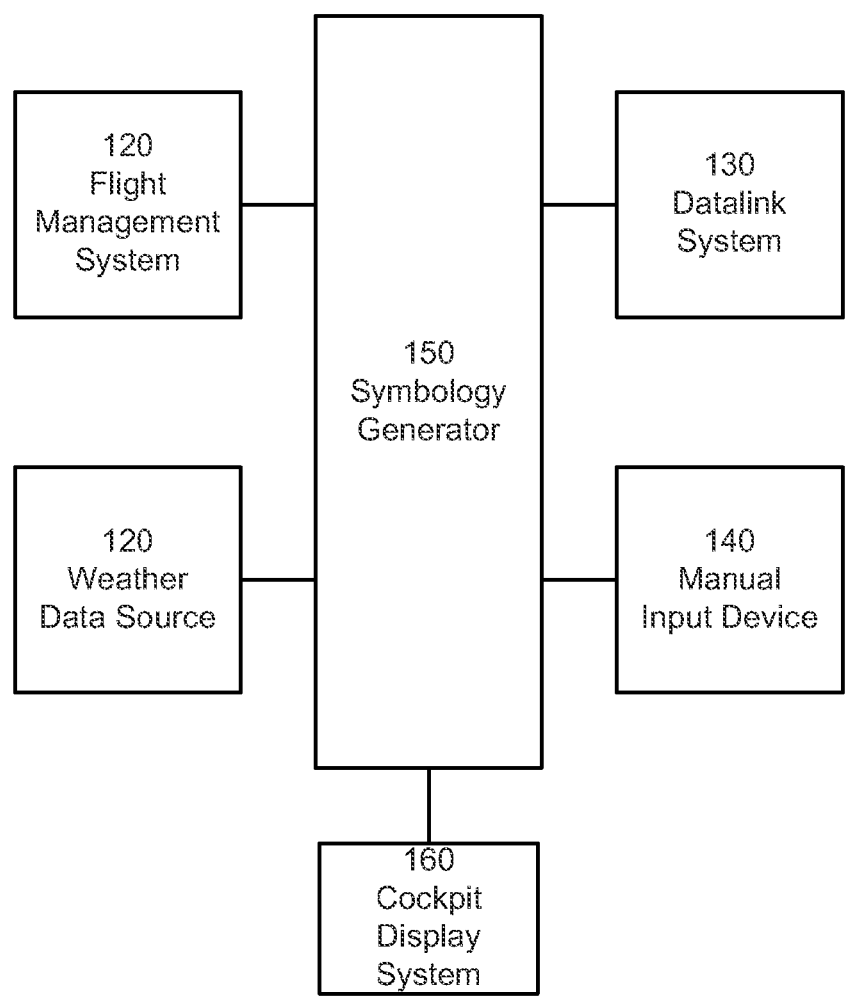
FIG. 1 depicts a block diagram of a winds aloft symbology presentation system.

FIG. 1 depicts a block diagram of winds aloft presentation system 100 suitable for implementation of the techniques described herein. The surface symbology presentation system 100 of an embodiment of FIG. 1 includes a flight management system ("FMS") 110, a weather data source 120, a datalink system 130, a manual input device 140, a symbology generator ("SG") 150, and a cockpit display system 160.

In an embodiment of FIG. 1, the FMS 110 may perform a variety of functions performed to help the crew in the management of the flight; these functions are known to those skilled in the art. These functions could include receiving a flight plan and constructing a lateral and vertical flight path from the flight plan. A pilot could create a flight plan by entering waypoints stored in a database or select a flight plan stored in a database of the FMS 110; also, the flight plan could be received and loaded into the FMS 110 automatically through the datalink system 130 known to those skilled in the art. Also, a flight plan may be modified at any time.

It should be noted that data, as embodied herein for any source or system in an aircraft, could be comprised of any analog or digital signal, either discrete or continuous, which could contain information. As embodied herein, aircraft could mean any vehicle which is able to fly through the air or atmosphere including, but not limited to, lighter than air vehicles and heavier than air vehicles, wherein the latter may include fixed-wing and rotary-wing vehicles.

As noted above, a flight plan may be changed or revised at any time after initialization. For lateral elements, waypoints could be inserted or deleted, holding procedures could be inserted or modified, legs to fly directly to waypoints may be inserted, the destination or alternate airport may be changed, and/or an offset path could be created to avoid hazardous meteorological conditions. For vertical elements, flight altitudes and/or flight levels may be modified.

In an embodiment of FIG. 1, the weather data source 120 could comprise any source of weather data including, but not limited to, XM Satellite Radio, Inc. and Universal Weather and Aviation, Inc. Weather data that may be broadcast could include data contained in not only in winds aloft reports but also other weather-related products such as, but not limited to, Aviation Routine Weather Report ("METAR"), Significant Meteorological Information ("SIGMET"), Airmen's Meteorological Information ("AIRMET"), Next-Generation Radar ("NEXRAD"), surface analysis weather maps, surface pressure, surface wind speed and direction, wind shear detection, echo tops, and freezing levels.

In an embodiment of FIG. 1, the datalink system 130 could be comprised of any system(s) and/or device(s) configured to facilitate a wireless, two-way communication of data to and from sources external to the aircraft including, but not limited to, ground stations and satellites that could serve as the weather data source 120. An example of a two-way communication of data is one which in a request for weather data is sent via the datalink system 130 and a response to such request is received via the datalink system 130, where the weather data could be representative of winds aloft information. Once received, the weather data could be provided to the SG 150 for subsequent processing as discussed herein.

In an embodiment of FIG. 1, the manual input device 140 could allow the pilot or flight crew to enter data manually instead of automatically. The manual input device 140 could be comprised of any source for facilitating a pilot's interaction with graphical user interfaces ("GUI") referred to as interactive widgets that are displayed by the cockpit display system 160 (some non-interactive widgets could also be displayed). The manual input device 140 may include any device that allows for the manual selection of a widget and/or entry of data. Furthermore, the manual input device 140 may include any device which allows a pilot to enter any data received by the SG 150 such as one or more surfaces created, developed, designed, and/or designated by the pilot. Such devices could include, but are not limited to, a tactile device (e.g., a physical keyboard with tactile buttons, control display unit, cursor control device, stylus, electronic grease pen, handheld device, touch screen device, notebook, tablet, electronic flight bag, etc. . . . ) and/or speech recognition systems. The manual input device 124 could be integrated with the cockpit display system 160 if it is configured to receive pilot input (e.g., handheld device, touch screen device, notebook, tablet, etc. . . . ).

In an embodiment of FIG. 1, the SG 150 may receive data from various systems including, but not limited to, the FMS 110, the weather data source 120, the datalink system 130, and/or the manual input device 140. The SG 150 may be operatively coupled to these to facilitate the receiving of input data; as embodied herein, operatively coupled may be considered as interchangeable with electronically coupled. It is not necessary that a direct connection be made; instead, such receiving of input data and providing of output data could be provided through a data bus or through a wireless network. The SG 150 may also be operatively coupled to the cockpit display system 160 to facilitate the providing of data generated by the SG 150.

In an embodiment of FIG. 1, the SG 150 may be representative of any electronic data processing unit or complex of processing units which execute software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The SG 150 may be driven by the execution of software or source code containing algorithms developed for the specific functions embodied herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, a processor could also consist of more than one electronic data processing unit. As embodied herein, the SG 150 could be a processor(s) used by or in conjunction with any other system of the aircraft including, but not limited to, a processor(s) associated with the FMS 110, the weather data source 120, the datalink system 130, the manual input device 140, the SG 150, and/or the cockpit display system 160.

In an embodiment of FIG. 1, the cockpit display system 160 could be comprised of any display unit having a display surface on which an image(s) may be presented to the pilot. The cockpit display system 160 could include, but is not limited to, a Primary Flight Display ("PFD") Unit, Navigation Display ("ND") Unit, Head-Up Display ("HUD") Unit, Head-Down Display ("HDD") Unit, Multi-Purpose Control Display Unit, Engine Indicating and Crew Alerting System Unit, Electronic Centralized Aircraft Monitor Unit, Multi-Function Display, Side Display Units, and/or Data Link Control Display Unit. The cockpit display system 160 may be configured to present one or more display(s) or image(s); as embodied herein, the terms "display" and "image" are interchangeable and treated synonymously.

The advantages and benefits of the embodiments discussed herein may be illustrated by showing a plurality of exemplary illustrations of a flight plan in FIG. 2 through FIG. 10B. In each of these illustrations, the flight plan shown in FIG. 2 may be an approved or contemplated flight plan comprised of the following waypoints located in the United States will be referenced: Ronald Reagan Washington National Airport ("KDCA"), Cincinnati/Northern Kentucky International Airport ("KCVG"), O'Hare International Airport ("KORD"), and The Eastern Iowa Airport ("KCID"). For the purpose of discussion herein, the flight plan could correspond to a flight flown in either direction, i.e., generally westerly between KDCA and KCID or easterly between KCID and KDCA.

It should be noted that, although only a flight plan is depicted in FIG. 2 through FIG. 10B, those skilled in the art understand that a manufacturer or end-user may configure a display to present other information simultaneously such as, but not limited to, terrain and/or obstacle information, maps showing geopolitical boundaries, airspace boundaries, airspace boundaries, and weather. Although the discussion herein will be drawn to a depiction of one illustrative flight plan, the embodiments are not limited to a display that depicts flight plans only.

Figures 2, 3, 7:
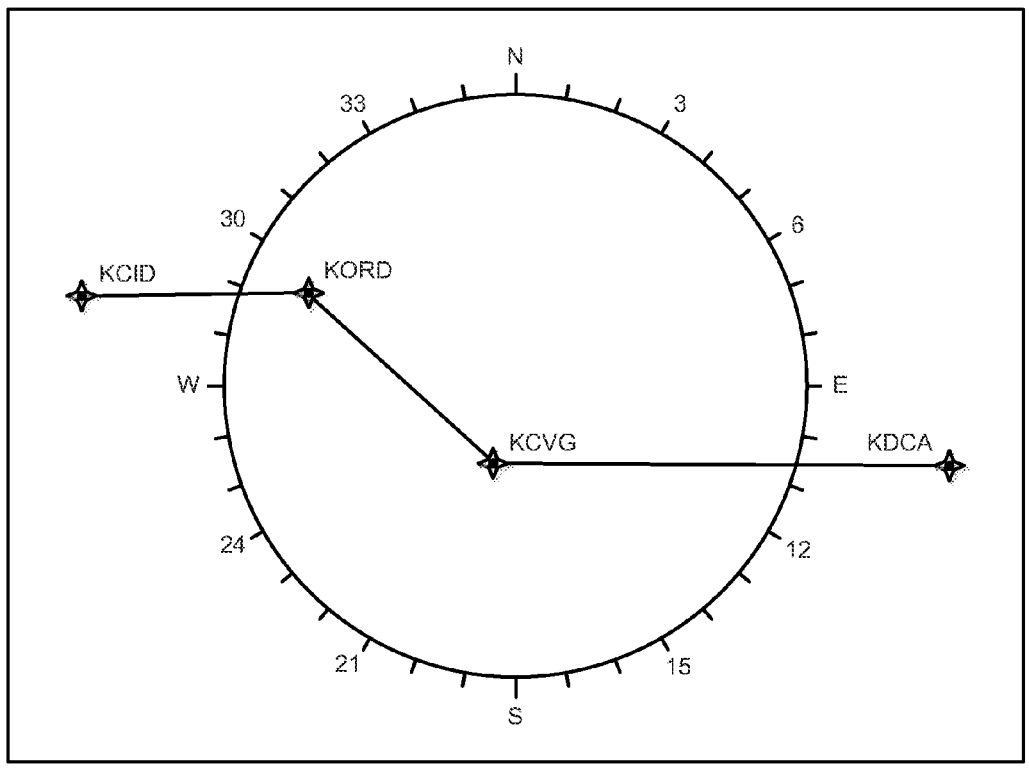
FIG. 2 depicts an approved or contemplated flight plan comprised of four waypoints.
FIG. 3 depicts a table containing winds aloft information for six altitudes at the four waypoints of the flight plan.
FIG. 7 depicts a second table containing winds aloft information for six altitudes at the four waypoints of the flight plan.
Figure 4A:
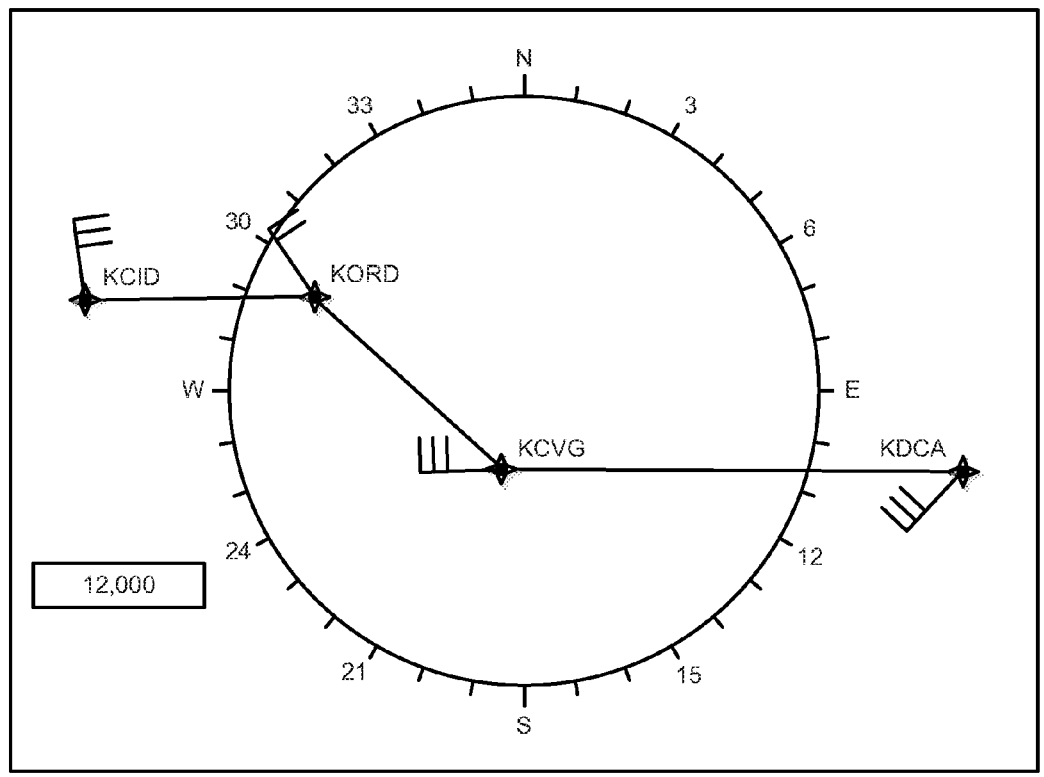
FIG. 4A illustrates a graphical depiction of winds aloft symbology for each of the four waypoints at a first altitude.
Figure 4B:
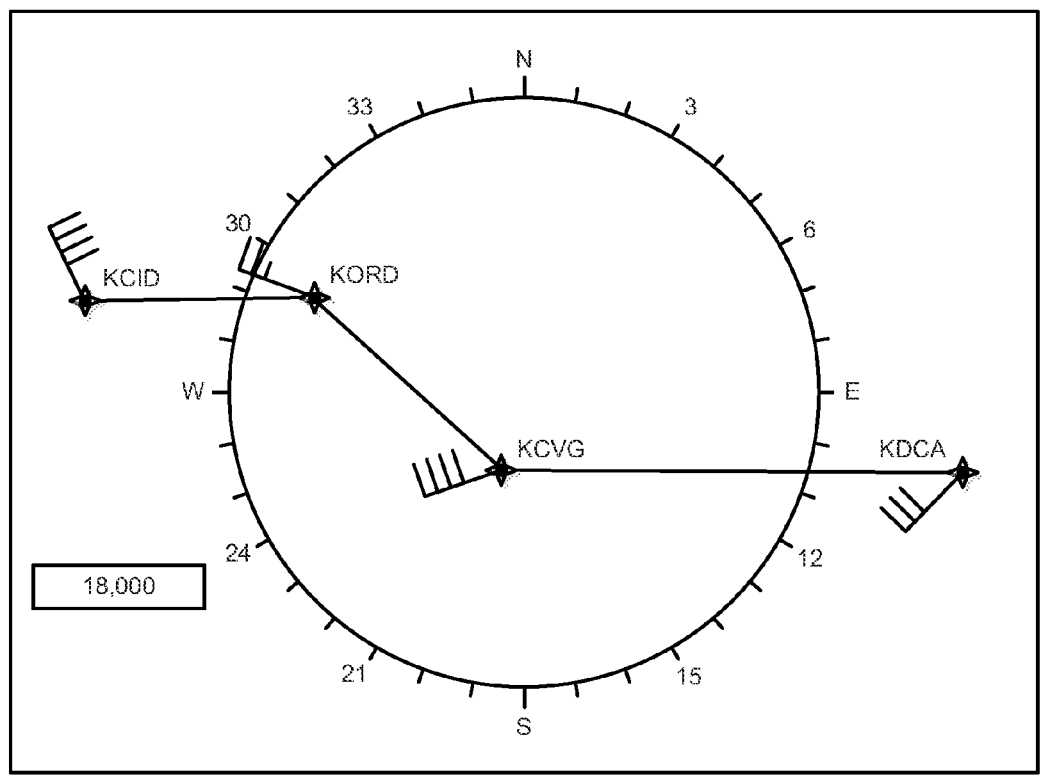
FIG. 4B illustrates a graphical depiction of winds aloft symbology for each of the four waypoints at a second altitude.
Figure 4C:
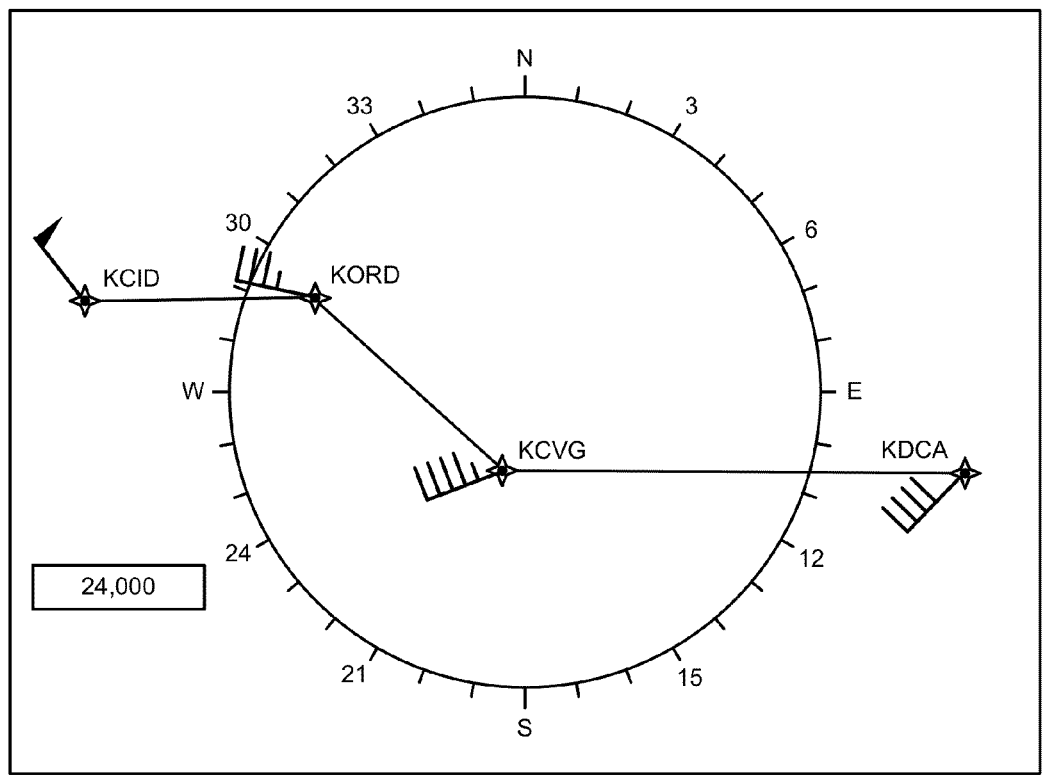
FIG. 4C illustrates a graphical depiction of winds aloft symbology for each of the four waypoints at a third altitude.
Figure 4D:
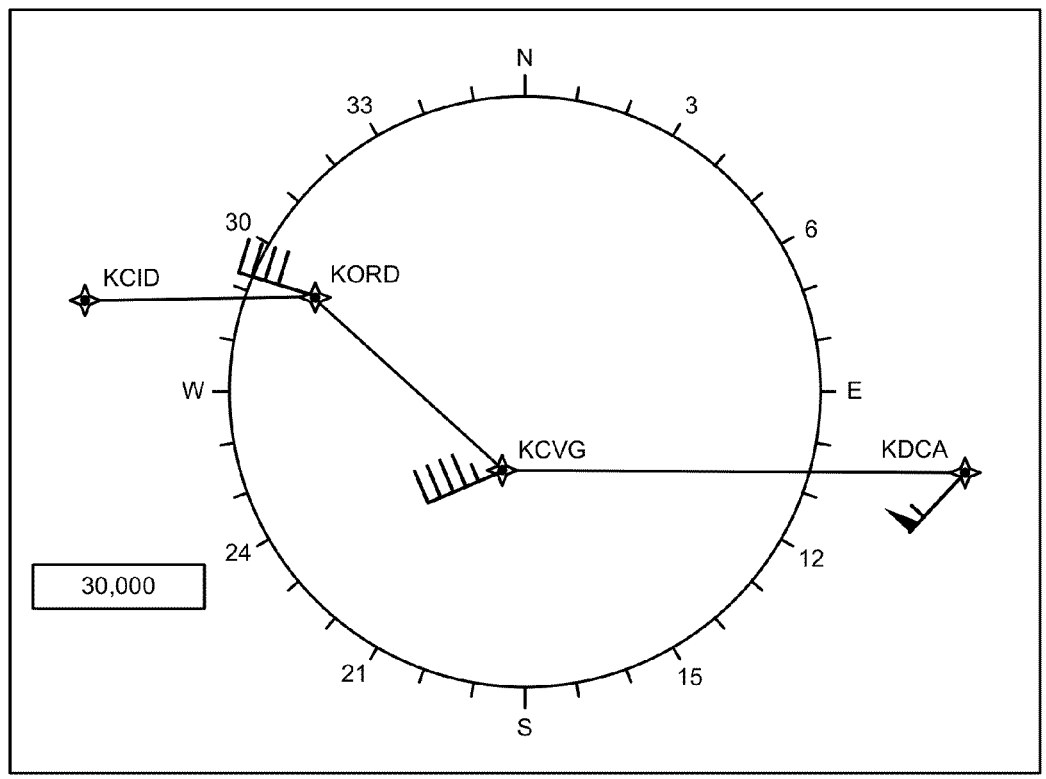
FIG. 4D illustrates a graphical depiction of winds aloft symbology for each of the four waypoints at a fourth altitude.
Figure 4E:
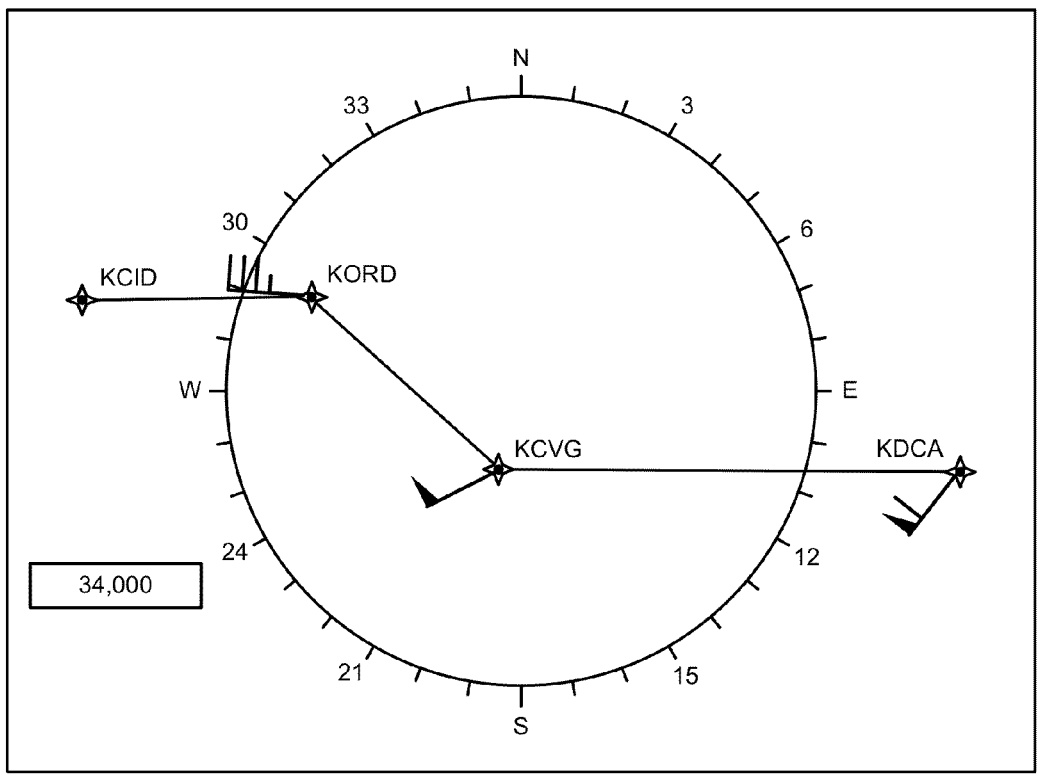
FIG. 4E illustrates a graphical depiction of winds aloft symbology for each of the four waypoints at a fifth altitude.
Figure 4F:
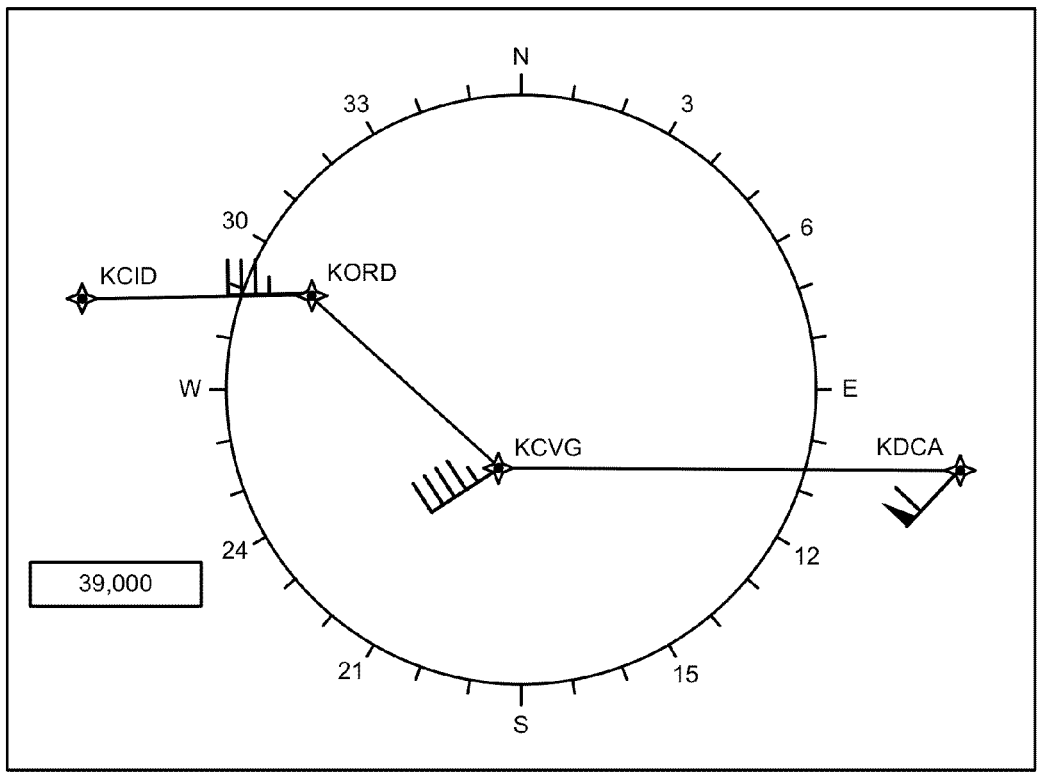
FIG. 4F illustrates a graphical depiction of winds aloft symbology for each of the four waypoints at a sixth altitude.

In an embodiment of FIG. 3, a table containing winds aloft information at one time of day for six altitudes at the four waypoints of the flight plan is shown for the six altitudes: 12,000 mean sea level ("MSL"); 18,000 MSL; 24,000 MSL; 30,000 MSL; 34,000 MSL; and 39,000 MSL. This information could have been provided by the weather data source 120 and received via the datalink system 130. A request for this information could have been initiated automatically through the FMS 110 and/or manually through the manual input device 140, where such request could include the identification of the waypoints of the flight plan and sent via the datalink system 130. If the weather data source 120 has been provided with the identification of the waypoints, the sending of winds aloft information by the weather data source 120 could have been initiated automatically or manually by personnel at the weather data source 120.

The winds aloft information shown in the tabular form of FIG. 3 may be presented graphically. As shown in FIGS. 4A through 4F, the winds aloft information for each of the four waypoints at each altitude at one time of day is depicted by symbols corresponding to wind speed and direction plots that are symbols known to those skilled in the art. Each symbol could be comprised of a wind pointer line, one or more winds barbs, and one or more winds pennants. The winds pointer could be a line indicating the direction from which the wind is coming. For example, the symbols shown in FIG. 4E indicate that the winds at 34,000 MSL are coming from the directions of 218 degrees, 243 degrees, and 274 degrees at KDCA, KCVG, and KORD, respectively. Where the long barb, short barb, and wind pennant correspond to wind speeds of 10 knots, 5 knots, and 50 knots of winds, respectively, the winds at 34,000 MSL (rounded up from the values shown in the table) are 60 knots, 50 knots, and 35 knots, respectively. As embodied herein, the length of the short barb could be configured unconventionally; that is the length could be configured to vary in length proportionally between 1 and 9 knots, where the shortest short barb former could equal 1 knot.

Figure 5A:
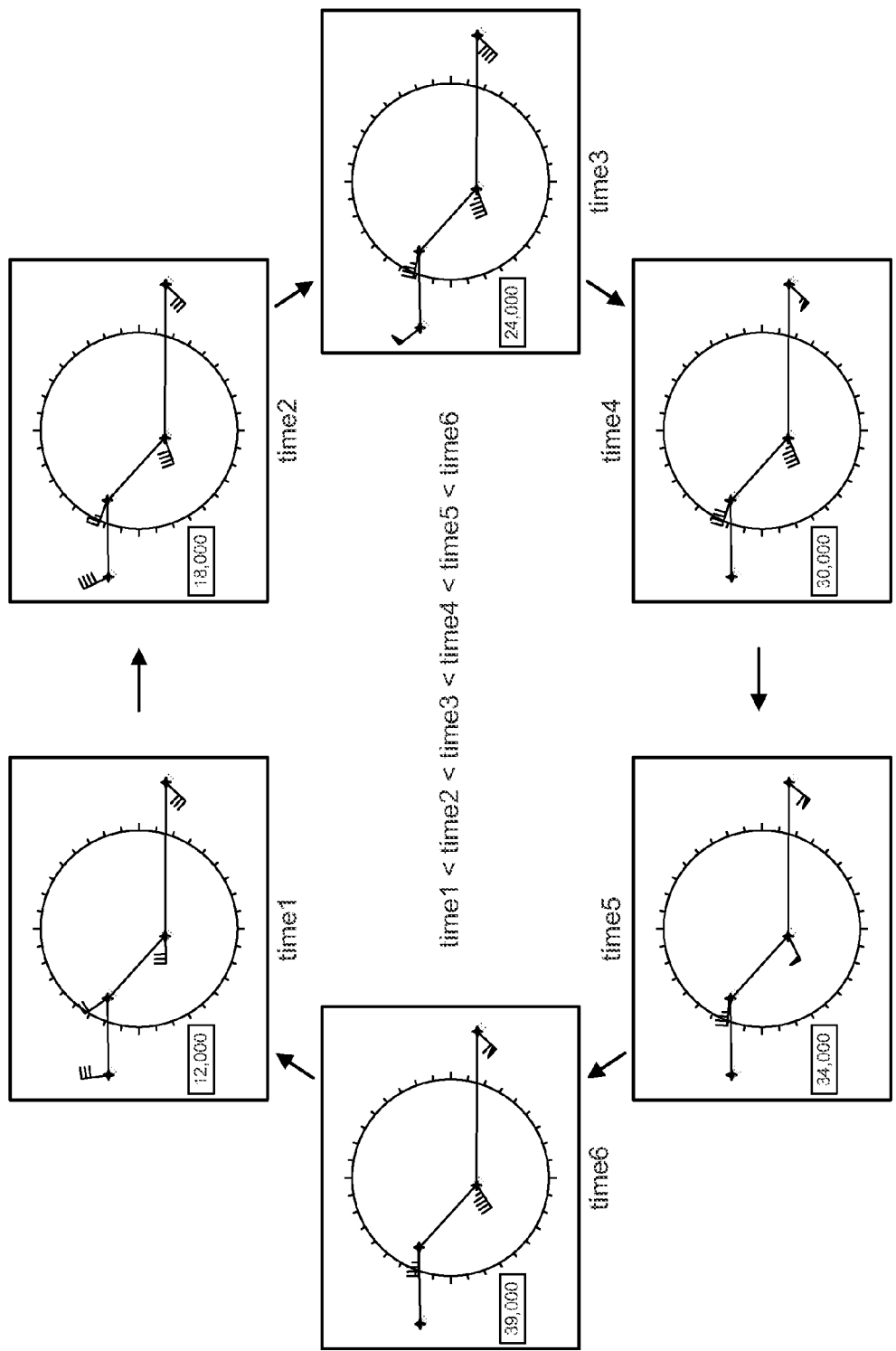
FIG. 5A illustrates a series of sets of winds aloft symbology in an order of increasing altitudes being presented sequentially.

The advantages and benefits of the embodiments discussed herein may be illustrated by showing examples in FIGS. 5A through 9 of how winds aloft information at a specific time of day may be presented graphically to improve a pilot's situational awareness of winds at a variety of altitudes at one time of day. In the embodiments of FIGS. 5A and 5B, winds aloft information of FIGS. 4A through 4F may be presented serially as a plurality of images. As shown in FIG. 5A, there is a series of increasing altitudes, where the series begins at 12,000 MSL and ends at 39,000 MSL; conversely, there is a series of decreasing altitudes shown in FIG. 5B, where the series begins at 39,000 MSL and ends at 12,000 MSL. In either instance, the series could be repeated as desired.

Figure 5B:
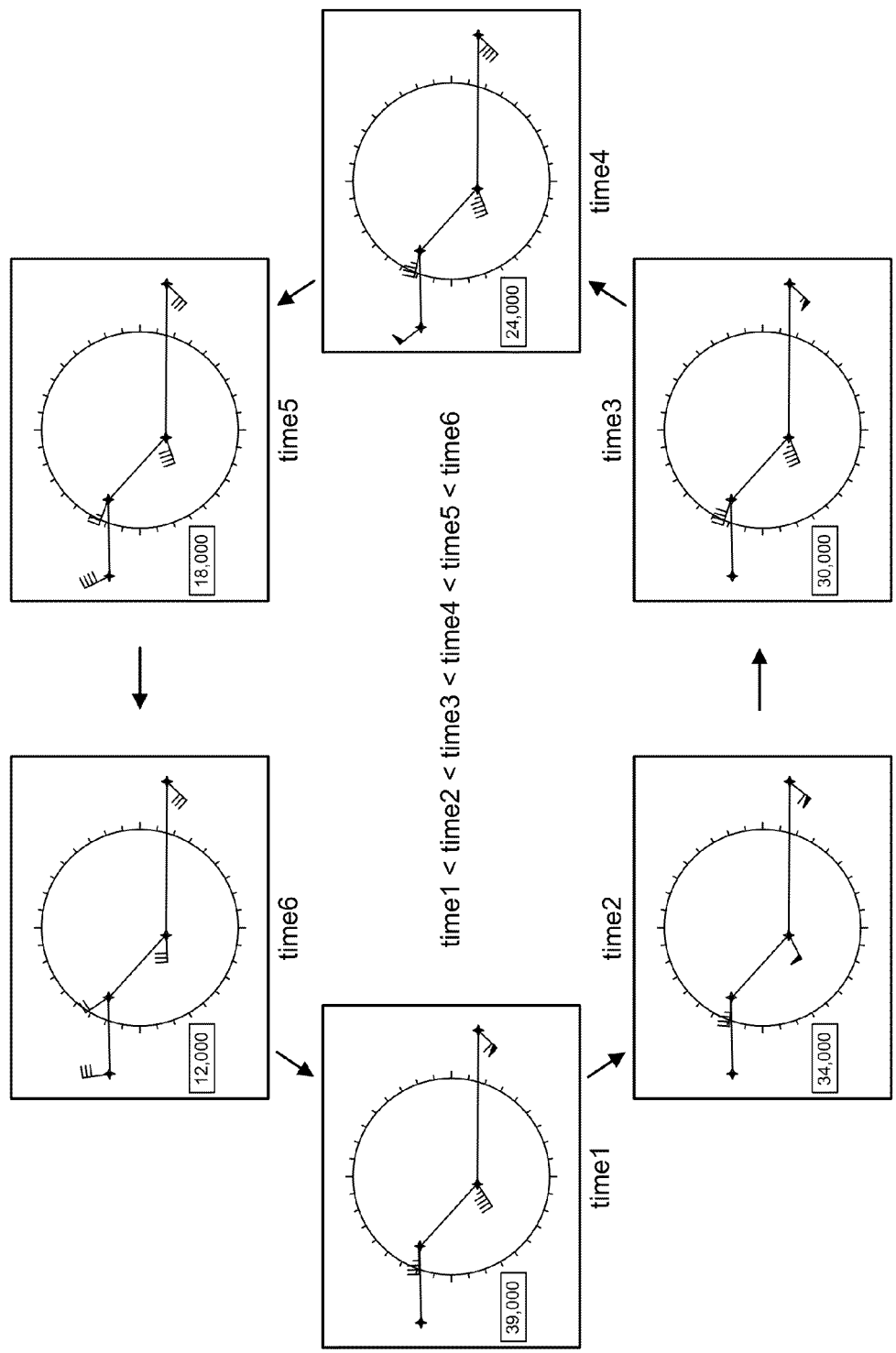
FIG. 5B illustrates a series of sets of winds aloft symbology in an order of decreasing altitudes being presented sequentially.

As embodied herein, a manufacturer and/or end-user could configure the series to be performed sequentially and automatically, where the rate of advancement from one altitude to the next altitude is performed automatically at timed intervals (which may be configurable at a default rate or for a pilot-selected rate); for the purpose of illustration and not of limitation, the rate could be equal to one altitude per one-half second (which means that the entire sequences of FIGS. 5A through 5B would be presented in a total of three seconds). In another embodiment, the series may be performed automatically but with manual advancements, where the advancement from one altitude to the next altitude may occur when the pilot's selection has been made via through the manual input device 140.

By viewing the graphical presentations of FIGS. 5A and 5B, the pilot may better comprehend the winds at various waypoints and at various altitudes by recognizing a pattern of wind changes. For example, after viewing the presentation of FIG. 5A, the pilot can recognize a counter-clockwise "rotation" of winds between 12,000 MSL and 24,000 MSL at KCID; a counter-clockwise rotation between 12,000 MSL and 24,000 MSL and between 30,000 MSL and 39,000 MSL at KORD; a counter-clockwise rotation between 12,000 MSL and 39,000 MSL at KCVG; and relatively no rotation between 12,000 MSL and 39,000 MSL at KDCA. Conversely, after viewing the sequential presentation of FIG. 5B, the pilot can recognize a clockwise rotation of winds between 24,000 MSL and 12,000 MSL at KCID; a clockwise rotation between 39,000 MSL and 30,000 MSL and between 24,000 MSL and 12,000 MSL at KORD; a clockwise rotation between 39,000 MSL and 12,000 MSL at KCVG; and relatively no rotation between 39,000 MSL and 12,000 MSL at KDCA.

Figure 6A:
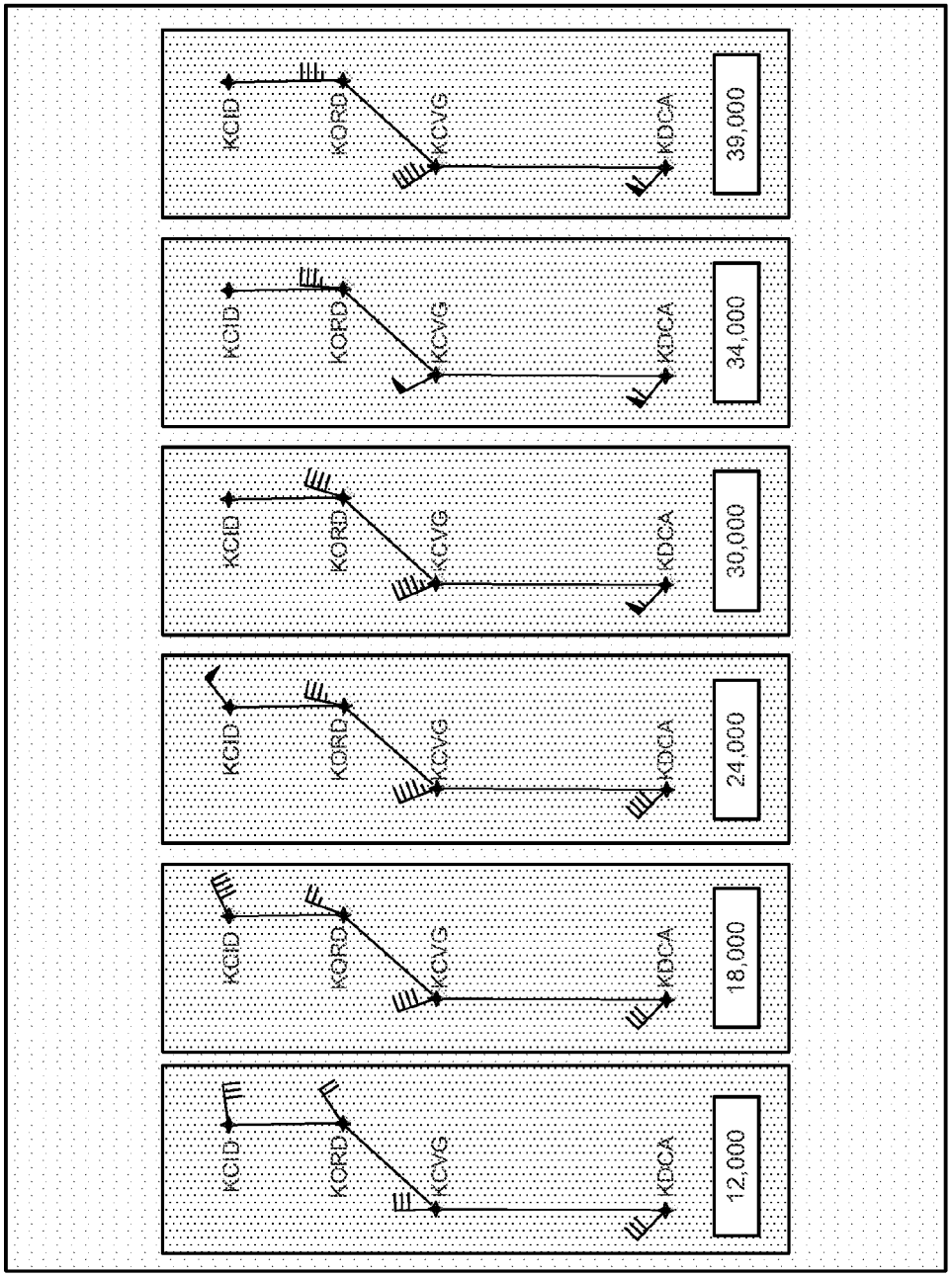
FIG. 6A illustrates a series of sets of winds aloft symbology in an order of increasing altitudes being presented simultaneously.
Figure 6B:
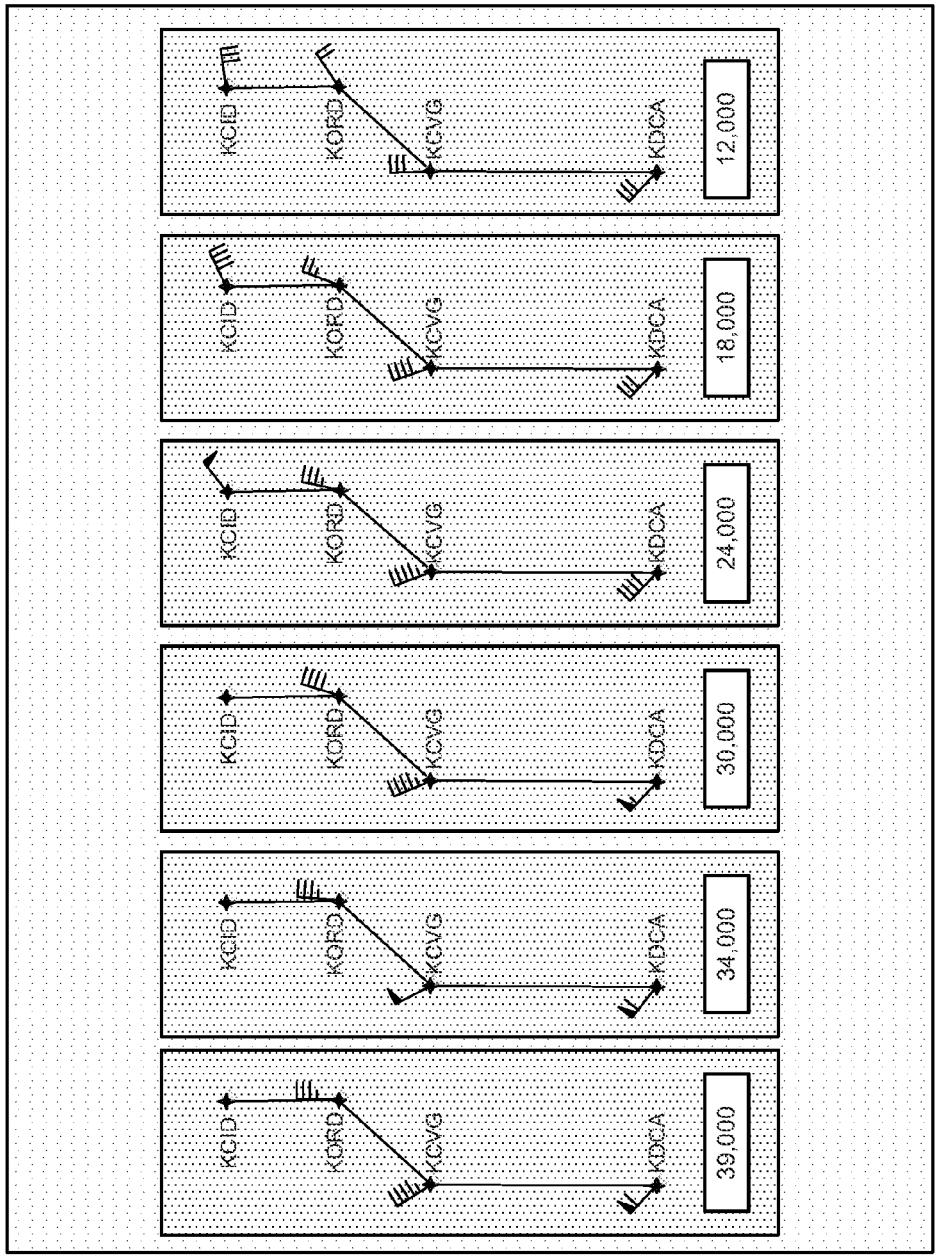
FIG. 6B illustrates a series of sets of winds aloft symbology in an order of decreasing altitudes being presented simultaneously.

In the embodiments of FIGS. 6A and 6B, winds aloft information of FIGS. 4A through 4F may be presented simultaneously in one image. As shown in FIG. 6A, there is a series of increasing altitudes presented horizontally from left to right, where the series begins at 12,000 MSL and ends at 39,000 MSL; conversely, there is a series of decreasing altitudes presented horizontally from left to right shown in FIG. 6B, where the series begins at 39,000 MSL and ends at 12,000

MSL. By viewing the presentations of FIGS. 6A and/or 6B, the pilot may better comprehend the winds at various waypoints and at various altitudes by making side-by-side comparisons. Moreover, if the pilot wishes to discern the rotations of winds discussed above, he or she may perform a side-to-side scan (i.e., left-to-right scan or right-to-left scan). It should be noted that the series could be presented vertically; if so, increases in altitudes could be presented vertically from top-to-bottom or bottom-to-top, requiring the pilot to perform a downwards or upwards scan to discern the rotations of winds.

The winds aloft information presented in the table of FIG. 3 may be broken into components corresponding to the direction of each leg of the flight plan (where the direction may be determined by the FMS 110). In an embodiment of FIG. 7, a table containing the equivalent winds aloft information as shown in the table of FIG. 3 is shown. In FIG. 7, the direction of KDCA-KCVG leg is 271 degrees leaving KDCA and 269 degrees arriving at KCVG (where the different between directions may be attributed to magnetic variation); the direction of KCVG-KORD leg is 320 degrees leaving KCVG and 319 degrees arriving at KORD; and the direction of KORD-KCID leg is 269 degrees leaving KORD and 265 degrees arriving at KCID.

Similar to the presentations discussed above, the winds aloft information shown in the tabular form of FIG. 7 may be presented graphically. As shown in FIGS. 8A through 8F, the winds aloft information based upon flight plan leg direction for each of the four waypoints at each altitude at one time of day is depicted by leg-based symbols, where the wind pointer of each symbol could be comprised of a line that is depicted parallel to a leg of the flight plan indicating a leg-based direction from which the wind is coming. As shown in FIGS. 8A through 10B, the end of the line of a wind pointer opposite of the wind barbs could be offset from the waypoint symbol by an offset line so that the two do not intersect; alternatively, the line of a wind pointer could coincide with a leg of the flight plan, where the configuration of such line could be one that makes it visually conspicuous or distinguishable from the leg.

Figure 8A:
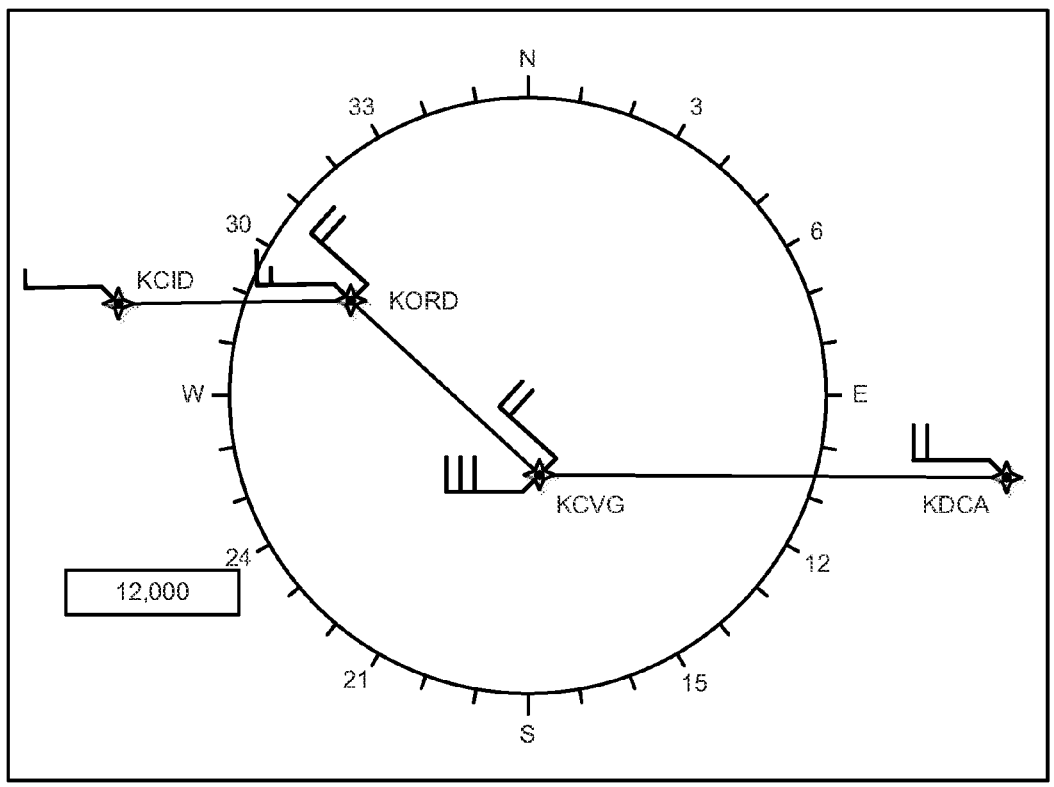
FIG. 8A illustrates a second graphical depiction of winds aloft symbology for each of the four waypoints at a first altitude.
Figure 8B:
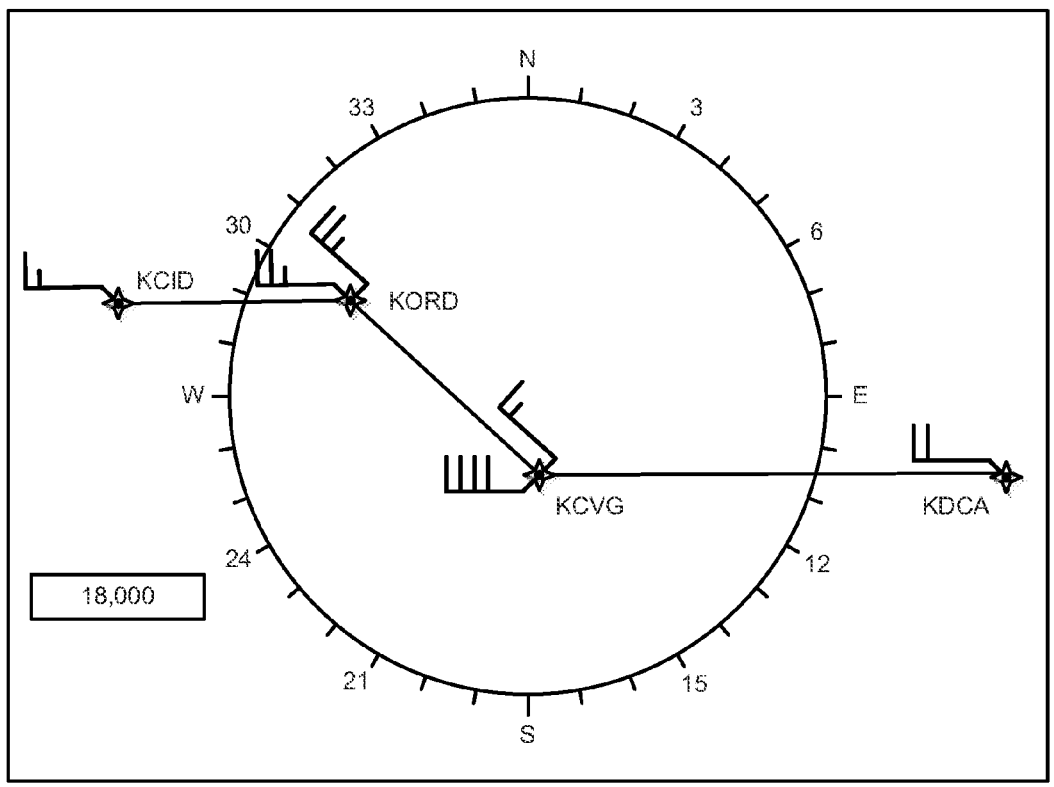
FIG. 8B illustrates a second graphical depiction of winds aloft symbology for each of the four waypoints at a second altitude.
Figure 8C:
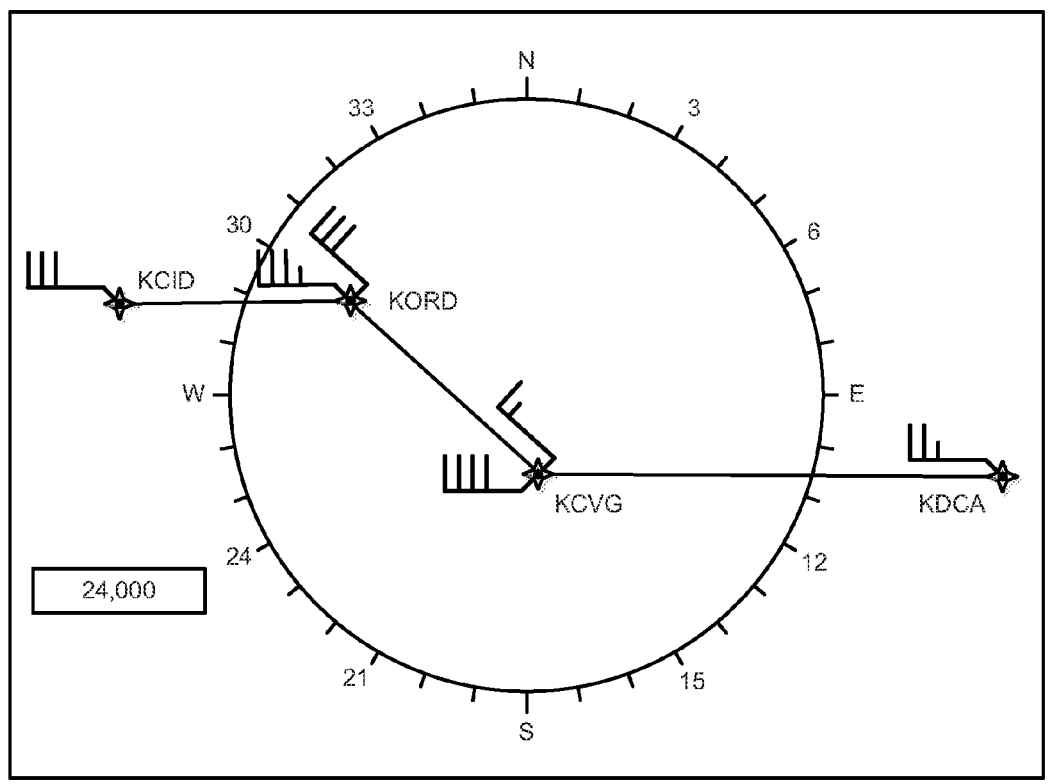
FIG. 8C illustrates a second graphical depiction of winds aloft symbology for each of the four waypoints at a third altitude.
Figure 8D:
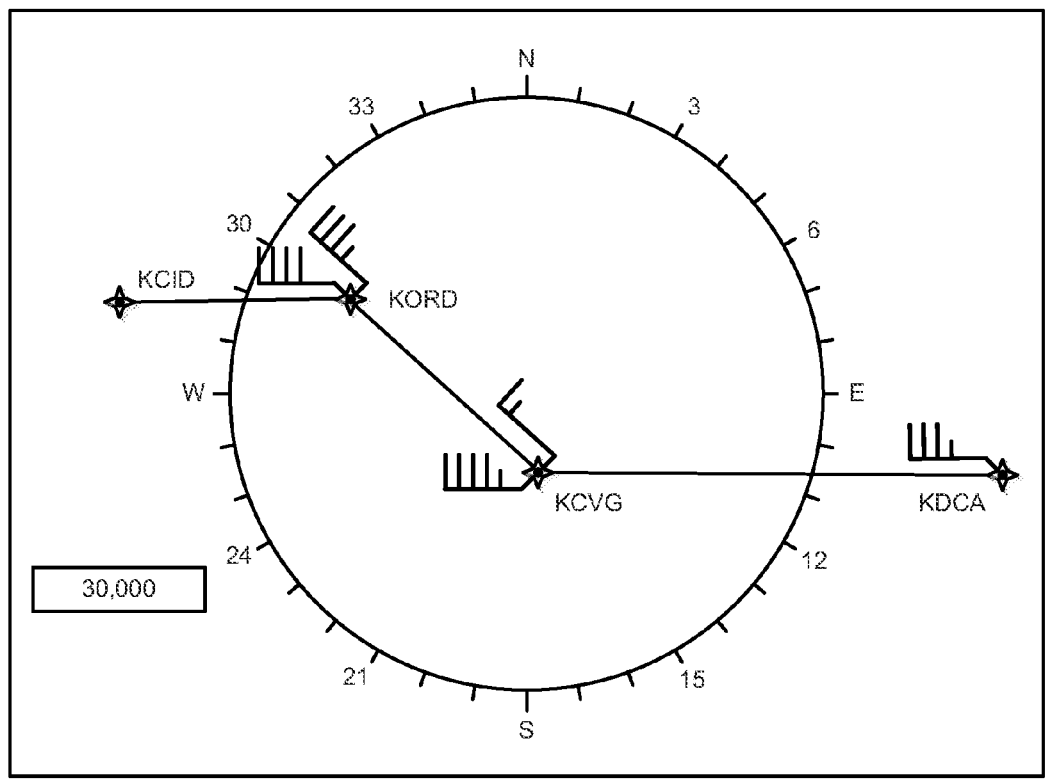
FIG. 8D illustrates a second graphical depiction of winds aloft symbology for each of the four waypoints at a fourth altitude.
Figure 8E:
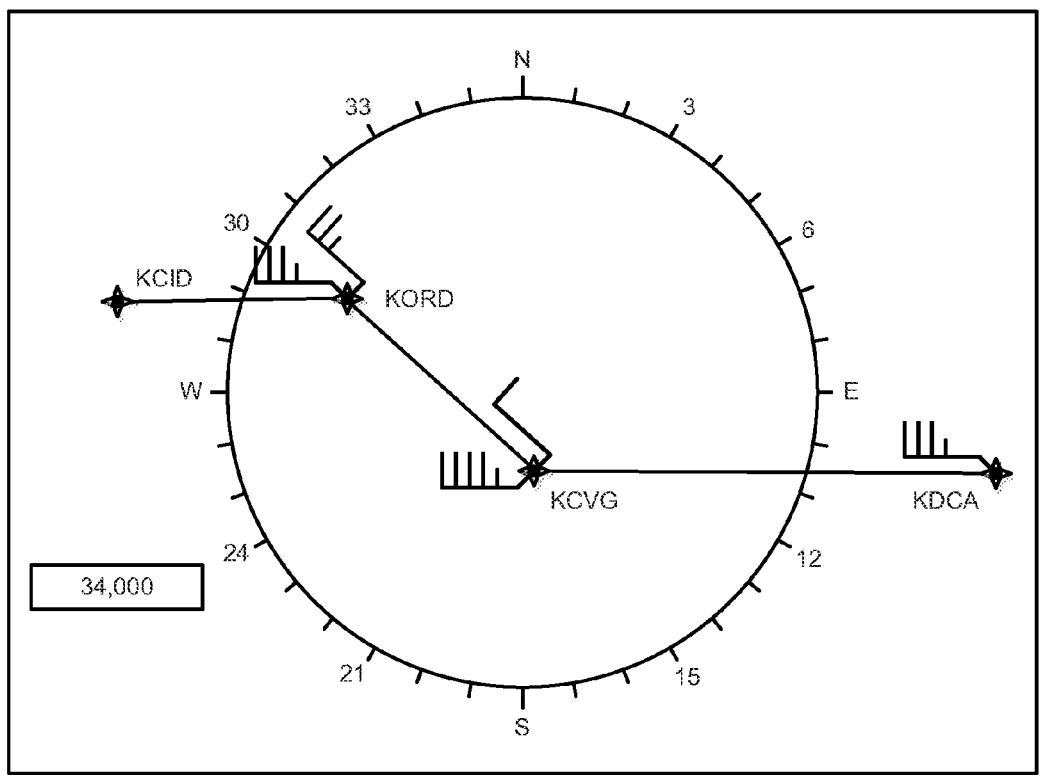
FIG. 8E illustrates a second graphical depiction of winds aloft symbology for each of the four waypoints at a fifth altitude.
Figure 8F:
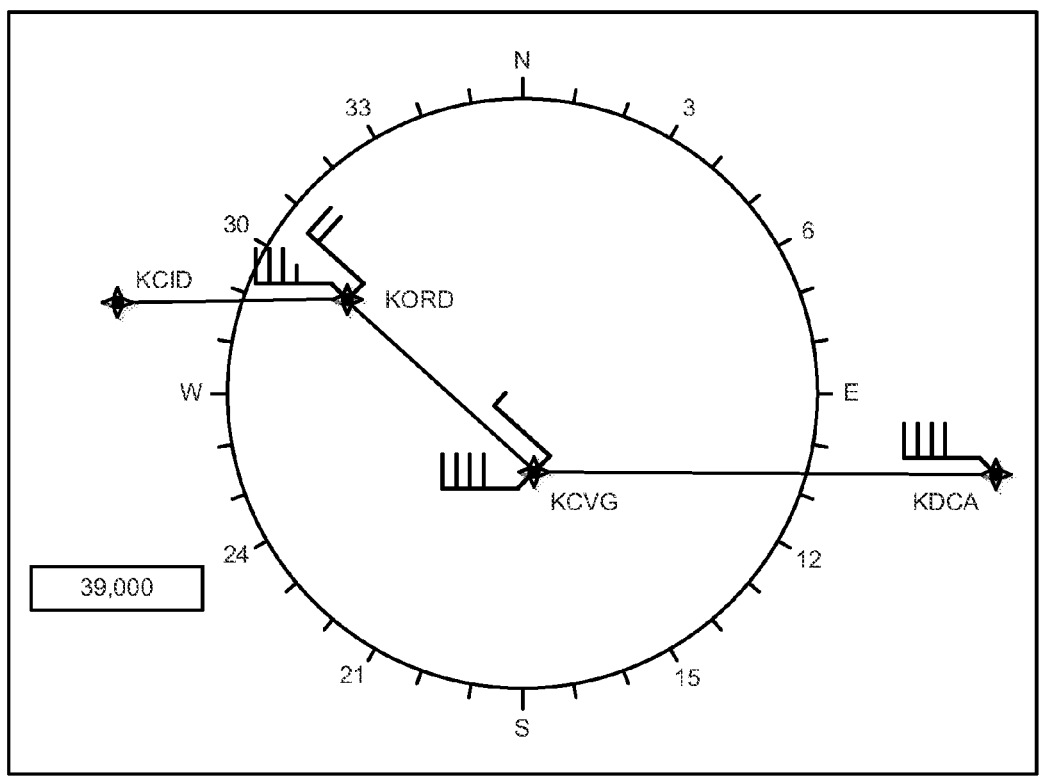
FIG. 8F illustrates a second graphical depiction of winds aloft symbology for each of the four waypoints at a sixth altitude.
Figure 9B:
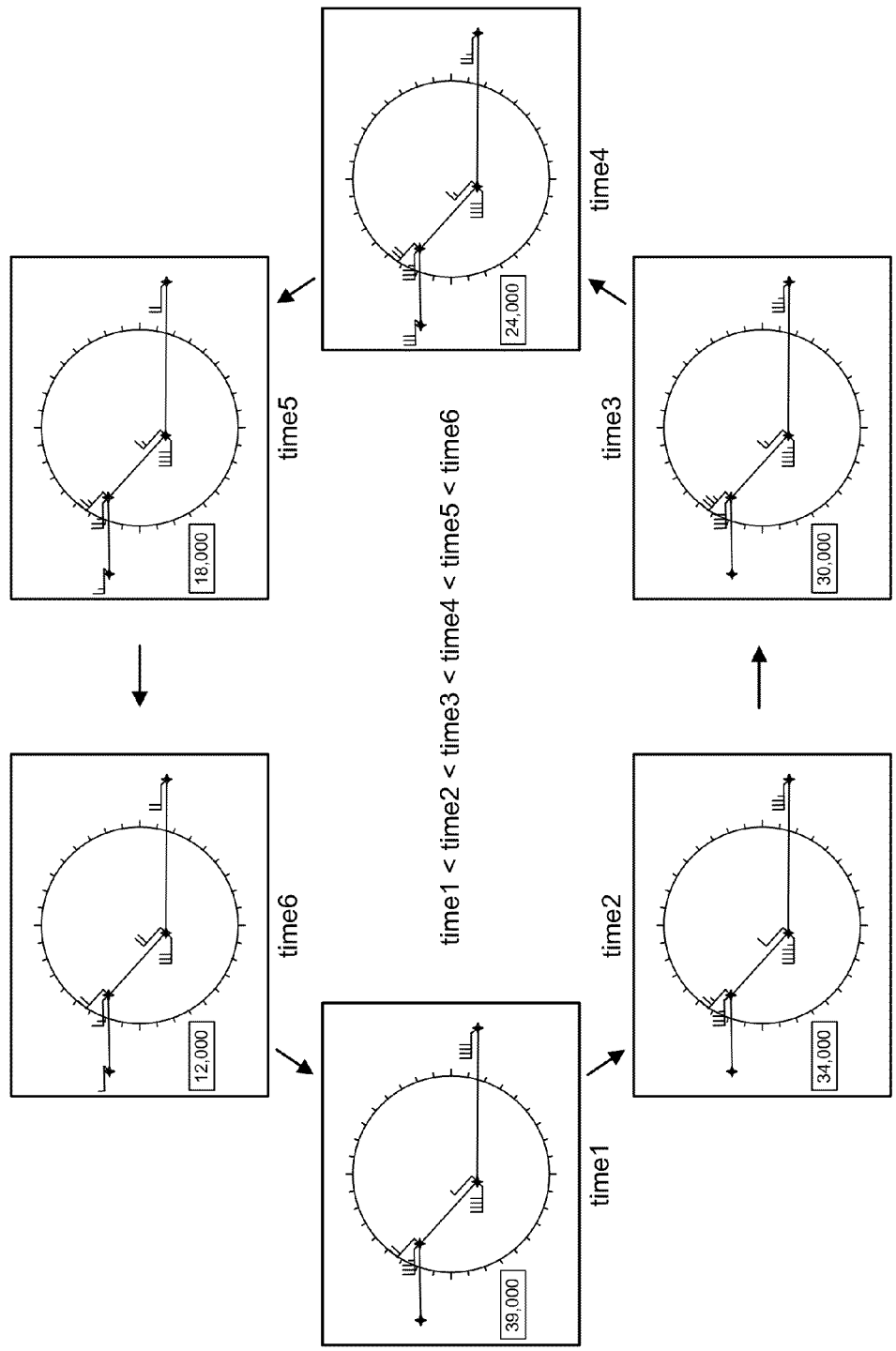
FIG. 9B illustrates a second series of sets of winds aloft symbology in an order of decreasing altitudes being presented sequentially.

In the embodiments of FIGS. 9A and 9B, winds aloft information of FIGS. 8A through 8F may be presented serially as a plurality of images. As shown in FIG. 8A, there is a series of increasing altitudes, where the series begins at 12,000 MSL and ends at 39,000 MSL; conversely, there is a series of decreasing altitudes shown in FIG. 5B, where the series begins at 39,000 MSL and ends at 12,000 MSL. By viewing the presentations of FIGS. 9A and 9B, the pilot may better comprehend the changes in winds at various waypoints and at various altitudes by recognizing changes in headwinds or tailwinds at each waypoint.

Figure 10A:
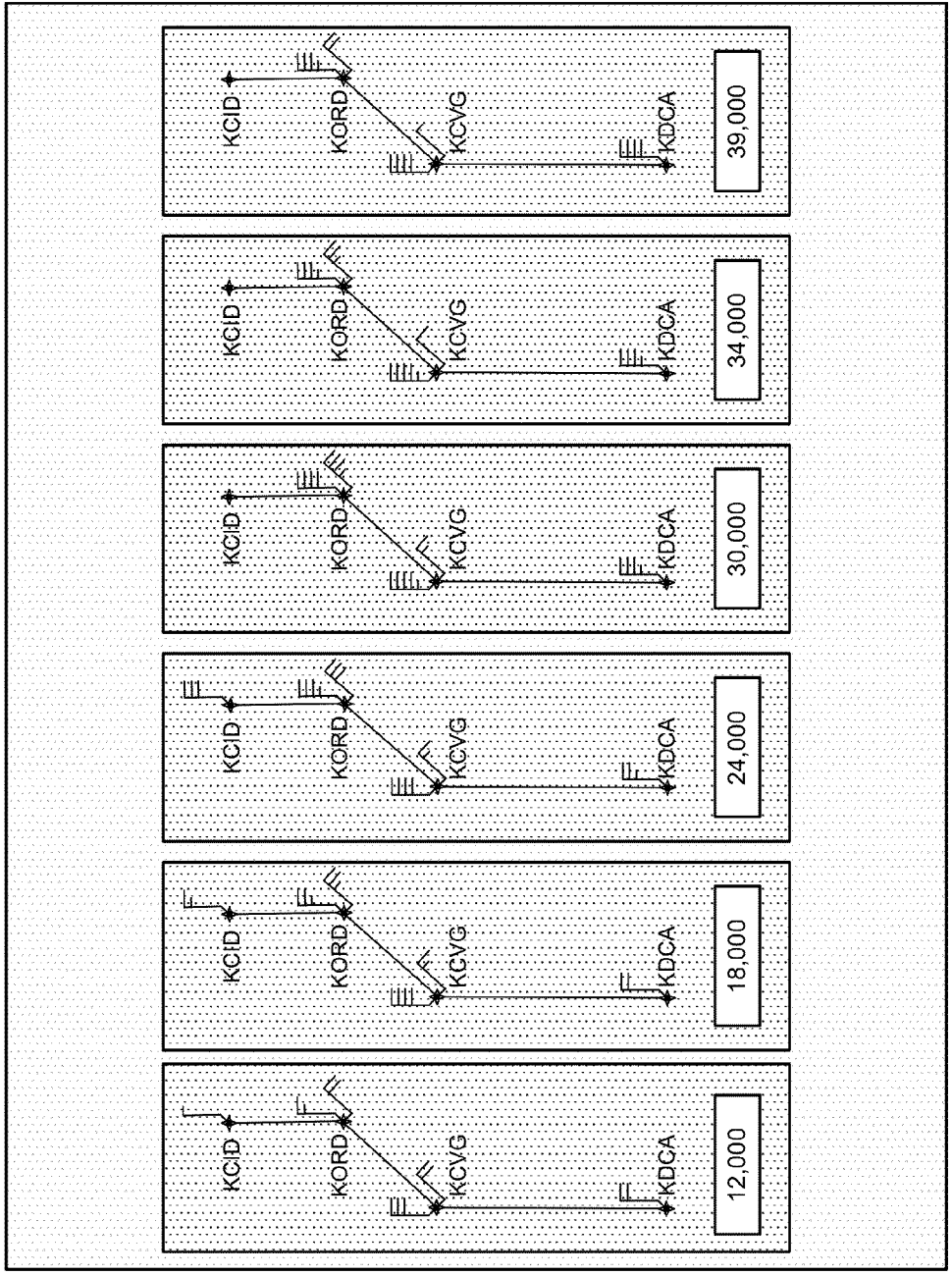
FIG. 10A illustrates a second series of sets of winds aloft symbology in an order of increasing altitudes being presented simultaneously.
Figure 10B:
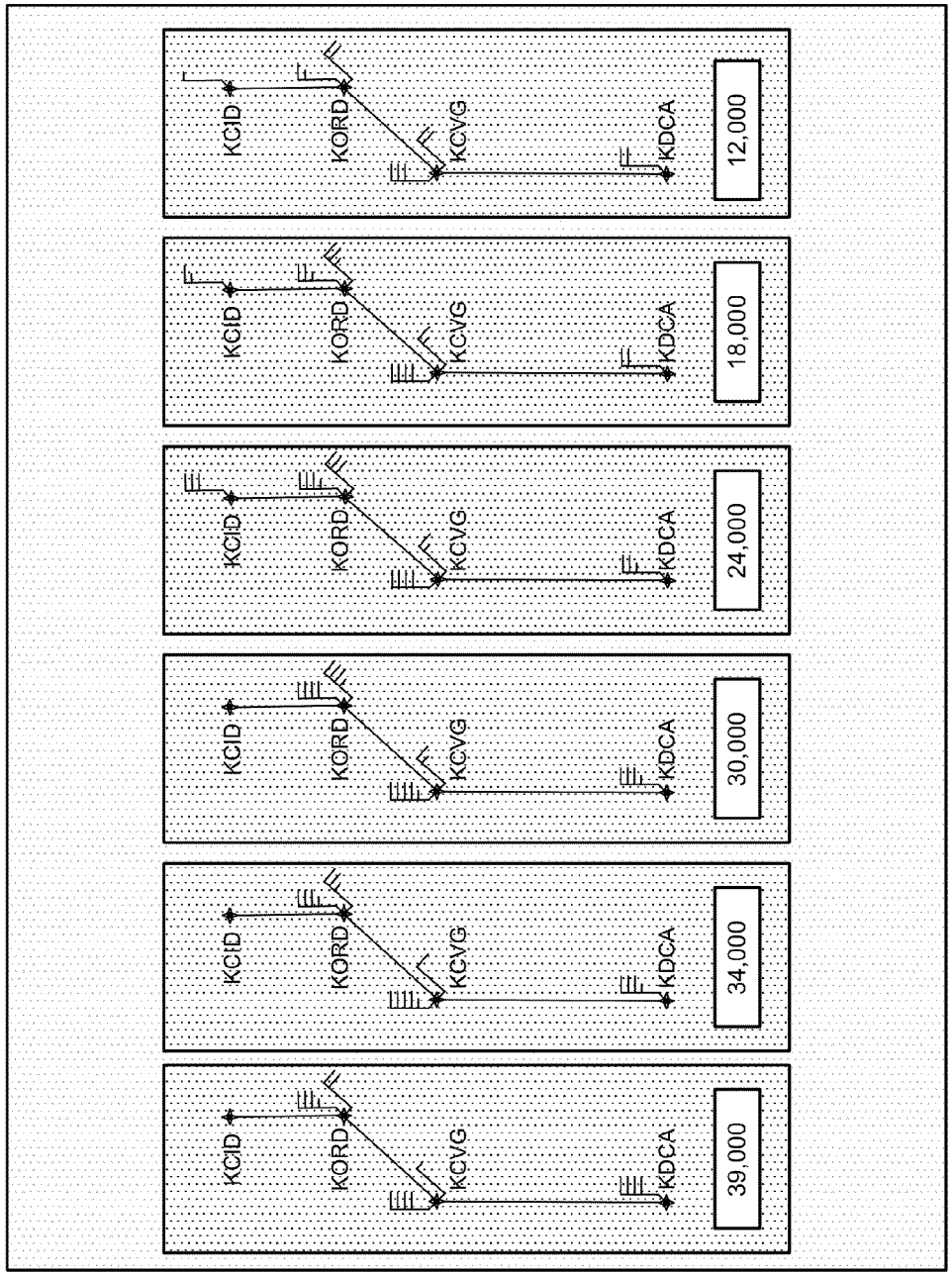
FIG. 10B illustrates a second series of sets of winds aloft symbology in an order of decreasing altitudes being presented simultaneously.

In the embodiments of FIGS. 10A and 10B, winds aloft information of FIGS. 8A through 8F may be presented simultaneously in one image. Similar to FIG. 6A, there is a series of increasing altitudes presented horizontally from left to right, where the series begins at 12,000 MSL and ends at 39,000 MSL; conversely, there is a series of decreasing altitudes presented horizontally from left to right shown in FIG. 6B, where the series begins at 39,000 MSL and ends at 12,000 MSL. By viewing the presentations of FIGS. 10A and/or 10B, the pilot may better comprehend the winds at various waypoints and at various altitudes by making side-by-side comparisons of headwinds or tailwinds. Moreover, if the pilot wishes to discern changes in headwinds or tailwinds, he or she may perform a side-to-side scan. If the series is presented vertically, increases in altitudes could be shown from top-to-bottom or bottom-to-top, requiring the pilot to perform a scan downwards or upwards to discern changes in headwinds or tailwinds.

Figure 11:
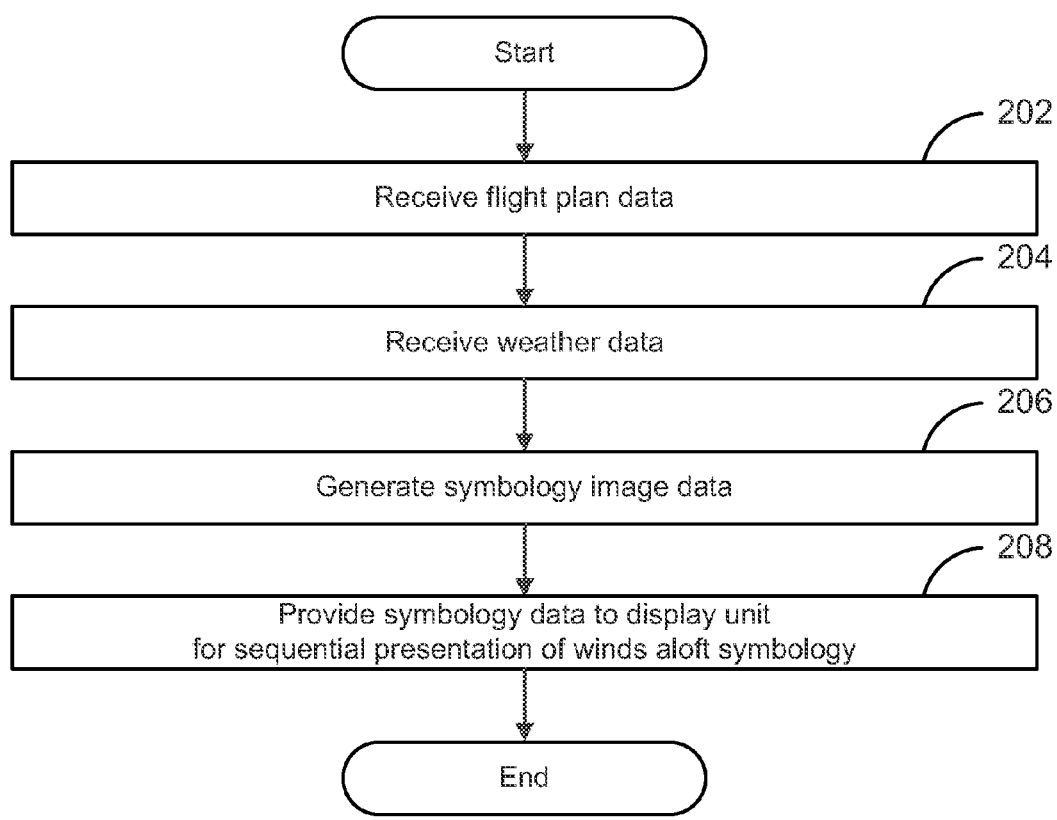
FIG. 11 depicts a flowchart of a method for presenting winds aloft symbologies on an aircraft display unit.

FIG. 11 depicts a flowchart 200 of an example of a method for presenting winds aloft symbology on an aircraft display unit, where the SG 150 may be programmed or configured with instructions corresponding to the following modules. As embodied herein, the SG 150 may be a processor of a cockpit display system 160 comprised of one or more display units. Also, the SG 150 may be a processor of a module such as, but not limited to, a printed circuit card having one or more input interfaces to facilitate data communications with the SG 150, i.e., the receiving and providing of data. As necessary for the accomplishment of the following modules embodied in FIG. 11, the receiving of data is synonymous and/or interchangeable with the retrieval of data, and the providing of data is synonymous and/or interchangeable with the making available or supplying of data.

The method begins with module 202 with the receiving of flight plan data from a source of such data such as the FMS 110. The flight plan data could be representative of waypoint information of a current or contemplated flight plan, where either flight plan could be comprised of two or more waypoints. As embodied herein, either flight plan could be comprised of one or more flight legs having known directions.

The method continues with module 204 with the receiving of weather data originating from a source of weather data such as the weather data source 120 and transmitted via the datalink system 130. The weather data could be representative of available winds aloft information for two or more altitudes at the waypoints defining the flight plan.

The method continues with module 206 with the generating of symbology image data as a function of the flight plan data and the weather data. The symbology image data could be representative of one or more sets of winds aloft symbologies. Each set could be comprised of winds aloft symbology corresponding to one or more waypoints of the flight plan, where such symbology may symbolize winds aloft for one altitude. In one embodiment, such symbology could be based upon the direction and speed from which the wind is coming. In another embodiment, such symbology could be based upon the known direction of each flight leg.

The method continues with module 208 with the providing of the symbology image data to one or more display units of the cockpit display system 160. As embodied herein, each display unit could be configured to present each set of winds aloft symbologies as a series of increasing or decreasing altitudes. In one embodiment, the series of increasing or decreasing altitudes may be presented sequentially such that one or a single set of winds aloft symbologies is visible or viewable to the pilot at one time. In another embodiment, the series of increasing or decreasing altitudes may be presented simultaneously such that two or more sets of winds aloft symbologies are visible or viewable to the pilot at one time. Then the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for presenting winds aloft information on a display unit, such system comprising:
a cockpit display system comprised of
a symbology generator configured to
receive flight plan data representative of waypoint information of a flight plan;
receive weather data representative of available winds aloft information for a plurality of altitudes corresponding to a plurality of waypoints;
generate symbology image data representative of a plurality of images of winds aloft symbologies as a function of the flight plan data and the weather data, where
each image of winds aloft symbologies
is comprised of non-numerical, symbolic representations of wind direction and wind speed corresponding to the plurality of waypoints, and
symbolizes wind direction and wind speed at a single altitude, where
each image of winds aloft symbologies is presentable with at least one leg of a flight path of the flight plan; and
provide the symbology image data to at least one display unit configured to present each image of winds aloft symbologies with at least one leg of the flight path in a series of images, such that
the series of images presents a progression of increasing or decreasing altitudes.

2. The system of claim 1, wherein
the winds aloft symbolized in each image of winds aloft symbologies is based upon the actual direction and speed from which the wind is coming.

3. The system of claim 2, wherein
the progression of increasing or decreasing altitudes is presented sequentially, such that
one image of winds aloft symbologies is viewable at one time.

4. The system of claim 2, wherein
the progression of increasing or decreasing altitudes is presented simultaneously, such that
the plurality of images of winds aloft symbologies is viewable at one time.

5. The system of claim 1, wherein
the flight plan data is further representative of at least one flight leg, where
each flight leg has a known direction, and
the winds aloft symbolized in each image of winds aloft symbologies is based upon the known direction of each flight leg.

6. The system of claim 5, wherein
the progression of increasing or decreasing altitudes is presented sequentially, such that
one image of winds aloft symbologies is viewable at one time.

7. The system of claim 5, wherein
the progression of increasing or decreasing altitudes is presented simultaneously, such that
a plurality of images of winds aloft symbologies is viewable at one time.

8. A device for presenting winds aloft information on a display unit, such device comprising:
a symbology generator configured to
receive flight plan data representative of waypoint information of a flight plan;
receive weather data representative of available winds aloft information for a plurality of altitudes corresponding to a plurality of waypoints;
generate symbology image data representative of a plurality of images of winds aloft symbologies as a function of the flight plan data and the weather data, where
each image of winds aloft symbologies
is comprised of non-numerical, symbolic representations of wind direction and wind speed corresponding to the plurality of waypoints, and
symbolizes wind direction and wind speed at a single altitude, where
each image of winds aloft symbologies is presentable with at least one leg of a flight path of the flight plan; and
provide the symbology image data to at least one display unit configured to
present each image of winds aloft symbologies with at least one leg of the flight path in a series of images, such that
the series of images presents a progression of increasing or decreasing altitudes.

9. The device of claim 8, wherein
the winds aloft symbolized in each image of winds aloft symbologies is based upon the actual direction and speed from which the wind is coming.

10. The device of claim 9, wherein
the progression of increasing or decreasing altitudes is presented sequentially, such that
one image of winds aloft symbologies is viewable at one time.

11. The device of claim 9, wherein
the progression of increasing or decreasing altitudes is presented simultaneously, such that
the plurality of images of winds aloft symbologies is viewable at one time.

12. The device of claim 8, wherein
the flight plan data is further representative of at least one flight leg, where
each flight leg has a known direction, and
the winds aloft symbolized in each image of winds aloft symbologies is based upon the known direction of each flight leg.

13. The device of claim 12, wherein
the progression of increasing or decreasing altitudes is presented sequentially, such that
one image of winds aloft symbologies is viewable at one time.

14. The device of claim 12, wherein
the progression of increasing or decreasing altitudes is presented simultaneously, such that
a plurality of images of winds aloft symbologies is viewable at one time.

15. A method for presenting winds aloft information on a display unit, such method comprising:
receiving flight plan data representative of waypoint information of a flight plan;
receiving weather data representative of available winds aloft information for a plurality of altitudes corresponding to a plurality of waypoints;

generating symbology image data representative of a plurality of images of winds aloft symbologies as a function of the flight plan data and the weather data, where each image of winds aloft symbologies
- is comprised of non-numerical, symbolic representations of wind direction and wind speed corresponding to the plurality of waypoints, and
- symbolizes wind direction and wind speed at a single altitude, where
  - each image of winds aloft symbologies is presentable with at least one leg of a flight path of the flight plan; and providing the symbology image data to at least one display unit configured to present each image of winds aloft symbologies with at least one leg of the flight path in a series of images, such that the series of images presents a progression of increasing or decreasing altitudes.

16. The method of claim 15, wherein
the winds aloft symbolized in each image of winds aloft symbologies is based upon the actual direction and speed from which the wind is coming.

17. The method of claim 16, wherein
the progression of increasing or decreasing altitudes is presented sequentially, such that
one image of winds aloft symbologies is viewable at one time.

18. The method of claim 16, wherein
the progression of increasing or decreasing altitudes is presented simultaneously, such that
the plurality of images of winds aloft symbologies is viewable at one time.

19. The method of claim 15, wherein
the flight plan data is further representative of at least one flight leg, where
each flight leg has a known direction, and
the winds aloft symbolized in each image of winds aloft symbologies is based upon the known direction of each flight leg.

20. The method of claim 19, wherein
the progression of increasing or decreasing altitudes is presented sequentially, such that
one image of winds aloft symbologies is viewable at one time.

21. The method of claim 19, wherein
the progression of increasing or decreasing altitudes is presented simultaneously, such that
a plurality of images of winds aloft symbologies is viewable at one time.

\* \* \* \* \*